March 22, 1927.                O. DANNEHL                1,622,132
SASH HOLDER
Filed Oct. 28, 1924
Fig. 3      Fig. 1      Fig. 2
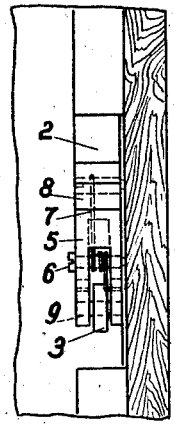 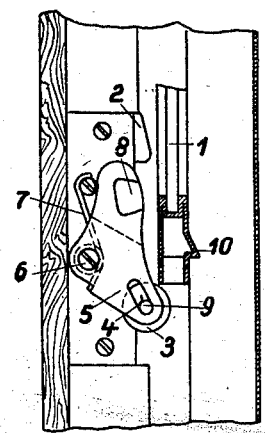 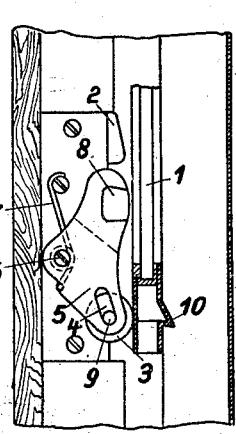
Fig. 6      Fig. 4      Fig. 5
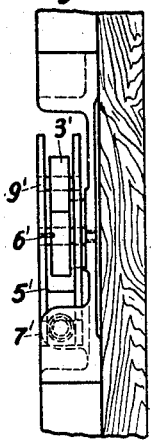 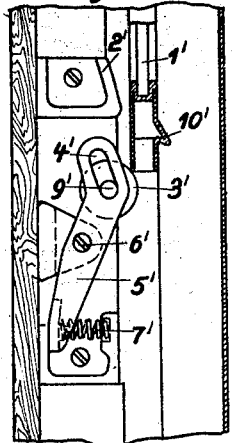 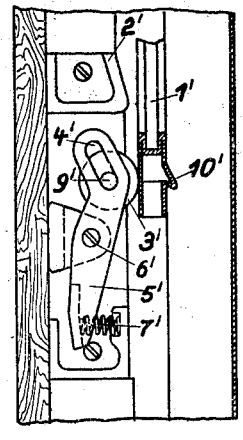
Fig. 9      Fig. 7      Fig. 8
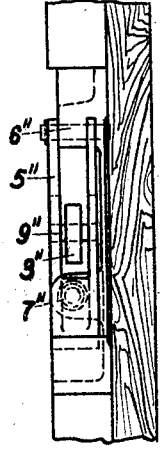 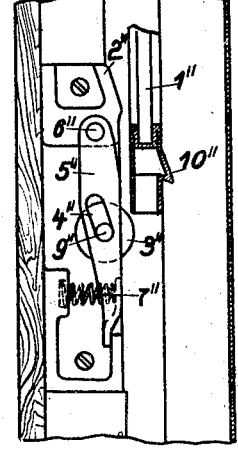 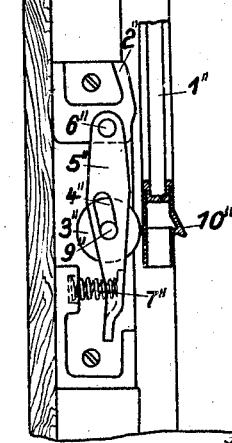
Inventor
O. Dannehl
By Marks & Clerk
Attys.

Patented Mar. 22, 1927.

1,622,132

UNITED STATES PATENT OFFICE.

OTTO DANNEHL, OF BERLIN-ZEHLENDORF, GERMANY, ASSIGNOR TO NAAMLOOZE VENNOOTSCHAP MACHINERIEEN EN APPARATEN FABRIEKEN, OF UTRECHT, HOLLAND.

SASH HOLDER.

Application filed October 23, 1924, Serial No. 746,425, and in Germany December 3, 1923.

In the case of vertically guided parts capable of upward and downward movement, such, for example, as sliding windows, provision is made for the guiding thereof either in such manner that the movement in both directions, whether from or towards the operator, is effected by hand with or without the assistance of counter-weights, or the upward motion is performed by means of suitably calculated weights, or finally in such manner that the hand is required to oppose a downward movement due to gravitation.

The general idea of the present invention consists in entirely leaving the downward motion to gravitation, and to eliminate the danger arising in connection with the object moved by means of a guideway provided with a braking device. The facilitation in manipulation is moreover accompanied by the advantage that the provision in general of counter-weights, and therefore a source of frequent disturbance, may be avoided. The objection that such a braking device might onerate the vertical movement is obviated by the employment of a braking device acting only in the one direction. To initiate the downward movement it is then merely necessary to release the holding or locking device retaining in position the object to be moved, whereupon the downward movement occurs automatically without danger.

Were this braking device to act right from the commencement upon the part to be lowered, the latter would then move only very slowly. It is therefore desirable to allow same to first fall or slide quite freely for a certain amount in the guideway, and to accord the braking device at the same time the task of a resilient retaining device, or to provide such in addition thereto and acting prior thereto, whereby this resilient retention may be effected at the end of the guide, or at any suitable intermediate point, in accordance with conditions.

The retention or the braking itself may be effected in any desired manner, either mechanically, hydraulically or pneumatically; consideration to simplicity and to negligible wear of the parts would suggest the desirability of employing rolling friction.

The retaining and braking device may be set into operation simply by hand; it is, however, of greater advantage to allow same to act automatically, making same, for example, dependent upon the locking device holding in position the part to be lowered, so that the adjustment of the braking and retaining device in the position of braking and retention is effected simultaneously through the release of the locking means. In certain cases to be observed in practice it will be even more reliable and desirable to make same independent of every other device, and to cause same to be set into operation by the motion of the part to be retained and braked.

It is shown in the way of a few examples in the following how, among the numerous possibilities, a means for vertical guiding characterized by this braking device may be set into practice.

Fig. 1 is a fragmentary side elevational view partly in section of one form of sash holder in a position preparatory to being engaged by the sash, Fig. 2 is a similar view showing the sash engaged by the holder, Fig. 3 is an end elevational view of the holder, Fig. 4 is a fragmentary vertical section partly in elevation of a modified form of holder in the position prior to the engagement of the sash, Fig. 5 is a similar view of the arrangement shown in Fig. 4 with the sash engaged.

Fig. 6 is an end elevational view of a modification shown in Figs. 4 and 5,

Fig. 7 is a fragmentary vertical section partly in elevation of a further modification of the invention the holder being shown prior to engagement with the sash, Fig. 8 is a similar view showing the sash engaged, and Fig. 9 is an end elevation of the arrangement shown in Fig. 7.

In Fig. 1 the vertical guiding of the part 2, shown by way of example as a sliding window, and the retaining and braking device, are illustrated shortly before the moment in which the retaining and braking device is set into operation by the downwardly moving window. The window frame is pressed against the guide fillets by means of the spur 2, and is about to thrust upon the roller 3 intercepting the same, said roller being rotatable around the axle 9. This roller 3 together with the axle 9 is displaceable in the slot 4 in the lower arm of the compound lever 5, which is rotatable around the axle 6 and, as disclosed by Fig. 3, embodied in the manner of a fork. In the normal position the roller 3 is forced towards the right by means of a spring 7, as shown in Fig. 1. The window frame, upon the downward movement, now presses the roller 3 towards the left into the position indicated in Fig. 2, and at the same time rotates the lever 5 in such manner that the pad 8 situated on the upper arm is likewise pressed against the window frame. Upon the frame, therefore, a sliding friction is exerted by the part 8, and a rolling friction by the part 3.

Upon the upward movement of the window the roller axle 9 recedes in the slot 4, and the brake member 8 likewise releases the window frame under the action of the spring 7.

Figs. 4–6 show a modification of the embodiment described, consisting in the fact that the lever 5' merely carries a retention and braking device in the form of the roller 3' with axle 9' in the slot 4', whilst the spring 7' acts upon the other arm of the lever 5', pressing the roller 3' against the window frame. The other part corresponds substantially to the construction shown in the preferred form corresponding primed numerals being employed therefor.

A further modification is shown in Figs. 7–9. In the case of this embodiment the lever 5 possesses only one arm, which is pivotal on the axle 6'', and this arm carries both the roller 3'' displaceable with the axle 9'' in the slot 4'' as well as the spring 7'' pressing same against the window frame. In this modification the remaining parts are indicated by the same reference numerals by means of the double prime.

The projection 10 on the frame of the window represents a locking member, which rests upon a support, for instance a weather rail, in the elevated position of the window, and prevents the latter from falling.

The braking device will be used in the main in pairs. If the part to be retained or braked is particularly heavy, the weight thereof may be partly compensated by counter-weights, so that the retaining and braking device may be kept sufficiently small to allow of same easily being mounted in the space at disposal. It is, of course, understood that the braking device may be used in connection with parts of the arrangement which move upwardly or in other directions, or braking devices may be employed in the case of such vertical guidings, in which the parts guided are automatically moved in an upward direction under the effect of an applied force, and would be endangered by not using a retaining or braking device.

What I claim is—

1. In a sash holder, the combination with a frame and slidable sash therein, of means mounted on the frame to automatically check sliding movement of the sash immediately upon contact of the sash therewith, and braking means carried with the last mentioned means also engageable with the sash so as to allow the sash to slide at reduced speed into closed position.

2. A sash holder of the character described, including a spring pressed lever adapted to be pivotally mounted on the frame and provided with a slot, a roller displaceable in the slot and adapted to be yieldably pressed into the path of the sash, the falling sash being adapted to strike with its lower edge against said roller whereby the rate of fall of the sash as the latter approaches the end of its movement is decelerated without completely arresting the fall of the sash, a pad carried by the lever in longitudinally spaced relation to the said roller and disposed in frictional contact with the falling sash immediately subsequent to the contact of the roller into rolling engagement with the said sash.

In testimony whereof I have affixed my signature.

OTTO DANNEHL.